United States Patent [19]

Kato

[11] Patent Number: 4,885,653
[45] Date of Patent: Dec. 5, 1989

[54] DISK CARTRIDGE WITH A HUB HAVING AN OUTSERT MOLDED CONTROL RING

[75] Inventor: Yoshitake Kato, Ibaraki, Japan

[73] Assignee: Hitachi Maxell, Ltd., Ibaraki, Japan

[21] Appl. No.: 342,581

[22] Filed: Apr. 19, 1989

Related U.S. Application Data

[63] Continuation of Ser. No. 23,279, Mar. 9, 1987, abandoned.

[30] Foreign Application Priority Data

Mar. 7, 1986 [JP] Japan ................................. 61-50878

[51] Int. Cl.$^4$ ........................ G11B 23/03; G11B 5/82
[52] U.S. Cl. .................................. 360/133; 360/135; 369/290
[58] Field of Search ................... 360/133, 135, 86, 97, 360/99; 369/291, 270, 271, 272, 280, 282; 206/444, 312

[56] References Cited

U.S. PATENT DOCUMENTS 4,366,516 12/1982 Ogata et al. .................... 360/129 X
4,616,278 10/1986 Yamaguchi et al. ............. 360/133 X
4,630,156 12/1986 Saito .................................. 360/133
4,686,666 8/1987 Dieffenbach .................. 360/133 X

FOREIGN PATENT DOCUMENTS 0116471 8/1984 European Pat. Off. .
0133541 2/1985 European Pat. Off. .
0142637 5/1985 European Pat. Off. .
0195330 9/1986 European Pat. Off. ............ 360/135
2127206 4/1984 United Kingdom .

Primary Examiner—Robert S. Tupper
Assistant Examiner—Andrew L. Sniezek
Attorney, Agent, or Firm—Antonelli, Terry & Wands

[57] ABSTRACT

A disk cartridge comprises a case and a disk encased in the case, the disk having a hub comprising a flange of thin metal sheet and a control ring integrated with the flange by outsert molding the control ring from a compound plastic containing 5 to 40% by weight of a filler, and a dimensional ratio of flange plate thickness to control ring inner diameter being 1/50 to 1/30. The hub has a higher plane precision, a higher attrition resistance, and a higher heat resistance.

16 Claims, 4 Drawing Sheets

DISK CARTRIDGE WITH A HUB HAVING AN OUTSERT MOLDED CONTROL RING

This application is a continuation of application Ser. No. 023,279, filed on Mar. 9, 1987 now abandoned.

BACKGROUND OF THE INVENTION

This invention relates to a disk cartridge encasing disk such as a magnetic disk, an optical disk, etc., and more particularly to an improvement in the material of a hub to be fixed at the center of the disk to rotate the disk.

One prior art document relating to such a hub is Japanese Patent Application No. 60-27547 filed by the Applicant, where the hub, as shown in FIG. 9, comprises a control ring 19 made from a plastic for defining the free movement of a disk 2 in a case 1, and a flange 18 made from a thin magnetic stainless steel sheet for being chucked by magnetic attraction, the control ring 19 and the flange 18 being integrally built up by outsert molding. The control ring 18 has, on its inside surface, a positioning surface for centering with respect to the driving shaft S for a disk drive, and the flange 18 has, on its plate surface, a driving hole 23 which is engaged with a driving pin P on the driving shaft. The flange 18 and the control ring 19 are so integrated that the flange 18 may cover the opening at one side of the control ring 19.

In the formation of a hub by integrating the control ring and the flange made from different kinds of materials by outsert molding, as described above, there are the following problems as to the molding owing to differences in the material characteristics therebetween, particularly to a large difference in the coefficient of thermal expansion. For example, the coefficient of thermal expansion of iron is $1.2 \times 10$ to the minus fifth power ($1.2 \times 10^{-5}$), whereas that of nylon 6-6 is $10 \sim 15 \times 10$ to the minus fifth power ($10 \sim 15 \times 10^{-5}$), and thus there is a difference of about 10 times therebetween. When there is a large difference in the coefficient of thermal expansion between the control ring and the flange, the control ring has a larger contraction ratio when solidified, and thus the plate surface of the flange will undergo warping deformation in the plate thickness direction owing to the internal stress developed by the solidification. Once the flatness of the plate surface of the flange is deteriorated by the warping deformation, track deviation or disk flapping is liable to occur while the disk is used, and will be a fatal drawback for a high density recording disk.

Furthermore, when a hub obtained by the said outsert molding is applied to a disk cartridge of relatively small size, it is necessary to prepare a smaller hub to meet the size-down of a disk diameter, but there has been a restriction with respect to the mechanical strength to make the sizes of a control ring, for example, thickness, ring width, etc. smaller. That is, the disk can be made smaller in size, but it has been impossible to make the hub smaller in the size than given limit value. Furthermore, the positioning surface on the control ring is liable to undergo attrition by the driving shaft, thereby giving a poor centering. When the control ring is a plastic molded article, it is hard to obtain a positioning surface with good durability and reliability against attrition over a long time.

SUMMARY OF THE INVENTION

An object of the present invention is to provide a hub for a disk, which comprises a control ring made of a plastic and a flange made of a thin metal sheet, which can be produced in a mass production scale with a high reliability and can meet requirements for the plane precision of the flange and the mechanical strength of the control ring.

The desired hub of the present invention can be produced by outsert molding a control ring from a compound plastic containing a filler, particularly a reinforcing filler capable of modifying the molding shrinkage of the compound plastic, when mixed, together with a flange.

Specifically, the plastic base material can be selected mainly from thermoplastic resins such as polyacetal, nylon, polybutylene terephthalate, polyester, polypropylene, polyethylene, polyfluoroethylene, etc.

The filler can be selected from potassium titanate, calcium carbonate, graphite, talc, glass fibers, etc., and can be in a granular, whisker or plate shape. 5 to 40% by weight, preferably 10 to 30% by weight, of the fillers is contained in the compound plastic. Below 5% by weight of the filler, the mold shrinkage will be increased, and the heat resistance will be lowered. That is, when the ambient temperature exceeds 60° C., the molded article is liable to be deformed, and the mechanical strength will be lowered, causing breakage or wearing. Above 40% by weight of the filler, the flowability of the molten compound plastic will be lowred, causing poor molding, and considerably deteriorating the impact resistance. That is, cracks are liable to develop.

In mixing the filler into the plastic base material, it is most important to make the coefficient of thermal expansion of the control ring as near that of the material of construction of flange 18 as possible to minimize the molding shrinkage.

The molding shrinkage can be defined by the numerical value obtained according to the following equation, and will be hereinafter based on this value:

$$\text{Molding shrinkage (\%)} = \frac{\text{Mold dimension} - \text{Molded article dimension}}{\text{Mold dimension}} \times 100$$

It is necessary that the molding shrinkage is not more than 1.8%, preferably not more than 1.5%. When the molding shrinkage is over 1.8%, a warping deformation develops on a flange 18 to cause a track deviation particularly in the case of a hub 17 applied to a disk 2 of large nominal size.

Most preferable compound plastic composition comprises polybutylene terephthalate or polyacetal as a plastic base material and 20% by weight of potassium titanate in a whisker state on the basis of the weight of the compound plastic composition, where a molding shrinkage of 0.8 to 1.4% can be obtained.

Material for the flange 18 is preferably magnetic stainless steel such as SUS 430, etc. in the case of chucking by magnetic attraction, and may be other metals in a sheet form, such as steel, copper alloy, aluminum alloy, etc. in the case of mechanical chucking.

The amount of warping deformation of the flange 18, for example, an amount of difference in the thickness direction of the flange 18 between the center of the flange 18 and the position of inner side edge of the control ring 19 depends upon the diameter of the control ring 19, even if the molding shrinkage of the control ring 19 is constant. To control the amount of warping deformation due to the mechanical structure, it is effective to set a dimensional ratio of the plate thickness T of the flange 18 (FIG. 4) to the inner diameter D of the control ring 19 (FIG. 3), i.e. T/D to at least 1/50, preferably 1/50–1/30. When the dimensional ratio T/D is below 1/50, it is difficult to control the amount of warping deformation only by molding from the compound plastic containing the filler.

BRIEF DESCRIPTION OF THE DRAWINGS

FIG. 1 is a bottom plan view of a disk cartridge, FIG. 2 is a plan view of a hub, FIG. 3 is a bottom plan view of the hub, and FIG. 4 is a cross-sectional view along the line A—A of FIG. 3.

FIG. 5 is a bottom plan view of a hub and FIG. 6 is a cross-sectional view along the line B—B of FIG. 5.

FIG. 7 is a bottom plan view of a hub and FIG. 7 is a cross-sectional view along the line C—C of FIG. 7.

DETAILED DESCRIPTION OF THE PREFERRED EMBODIMENTS

Figure 1:
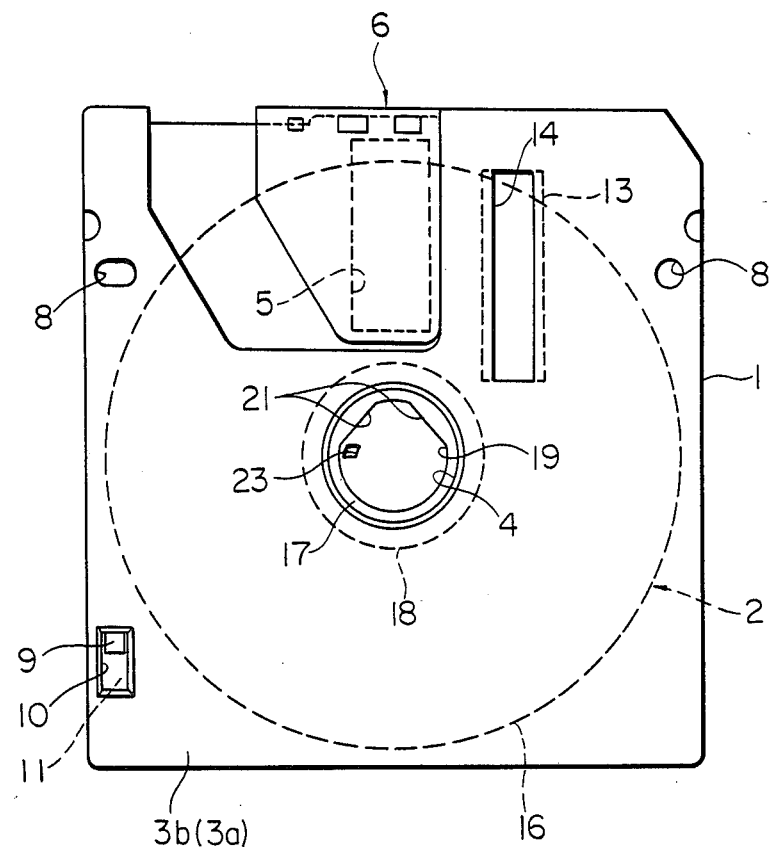
FIGS. 1 to 4 show a first application embodiment 1 of a disk cartridge according to the present invention, where

Some application embodiments of a disk cartridge according to the present invention will be described in detail below, referring to the drawings.

Application Embodiment 1

FIGS. 1 to 4 show a first application embodiment of a disk cartridge.

In FIG. 1, a disk cartridge (nominal size: 2.5 inch) is composed of a rectangular case 1 and a disk 2 rotatably encased therein. The case 1 is composed of upper and lower shells 3a and 3b joined together at the periphery to form a hollow inside. The lower shell 3b has a circular driving shaft insert opening 4 substantially at the center thereof, and both upper and lower shells 3a and 3b each have a rectangular head insert 5 at a position near the front end. The head insert openings 5 are brought into an open or closed state by the shutter 6.

The shutter 6 is injection molded from a compound plastic containing a reinforcing filler, and supported slidably in the lateral direction of the case 1, and kept by the force of a spring (not shown) at a position to close the head insert openings 5 when the disk cartridge is not charged into a disk drive, while the shutter 6 undergoes opening operation against the force of the spring when charged into the disk drive.

The lower shell 3b further has insert holes 8 for a positioning pin, an operational groove 10 for operating a write protect notch 9, etc. The upper shell 3a has a detection hole 11 of the same shape as the operating groove 10 capable of being opened or closed by the write protect notch 9 and a recess for pasting a label. Cleaning members 13 capable of sandwiching the disk 2 through liner sheets not shown in the drawings are provided on the inside surfaces of the upper and lower shells 3a and 3b at a position on the disk-coming side in the disk rotating direction as viewed from the head insert opening 5. These cleaning members 13 are supported from the outside of the case through operational openings 14 provided through the walls of the upper and lower shells 3a and 3b to make cleaning of the disk 2 and prevent the flapping of a magnetic sheet 16 as driven.

The disk 2 is composed of a circular magnetic sheet 16 and a hub 17 facing the said driving shaft insert opening 4 as fixed at the center of the magnetic sheet 16. The hub 17 is composed of a flange 18 made from a thin magnetic stainless steel sheet of SUS 430 and a control ring 19 as fixed thereto by outsert molding. The magnetic sheet 16 is fixed to the flange 18 by adhesion. The control ring 19 has a chevron-shaped positioning part 21 for concentrically positioning the entire disk with respect to the driving shaft of the disk drive, whereas the flange 18 has a diamond-shaped driving hole 23 with which a driving pin is engaged.

Figure 2:
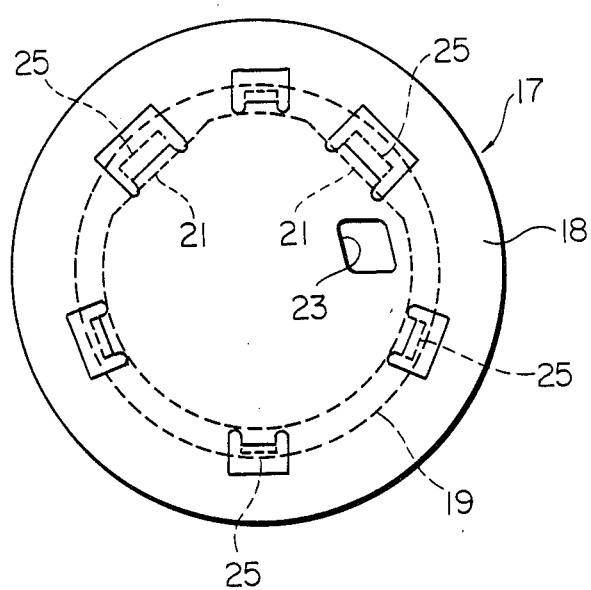
Figure 4:
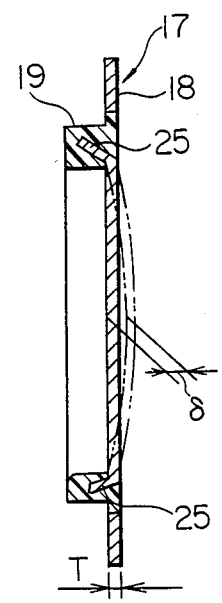
Figure 5:
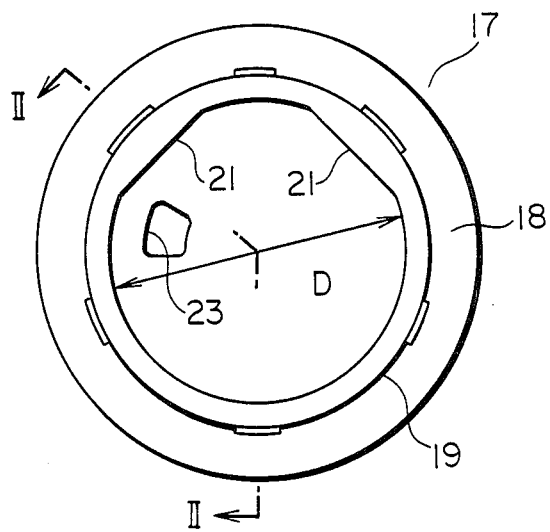
FIGS. 5 and 6 show a second application embodiment of a hub according to the present invention, where

To further intensify the connection between the flange 18 and the control ring 19, connection lugs 25 are formed by blanking from the sheet of flange 18 toward the peripheral side and embedded into the wall of the control ring 19 as shown in FIGS. 2 and 4. The connecting lugs 25 are provided at 6 positions in the peripheral direction of the control ring 19 including the position corresponding to the positioning part 21. The connection lug corresponding to the positioning part 21 is formed broader and longer than other connection lugs.

The main dimensions of the hub 17 applied to the disk cartridge of 2.5-inch nominal size shown in FIGS. 1 to 4 are as follows:

| | |
|---|---|
| Cylindrical wall thickness of control ring 19: | 1 mm |
| Inner diameter of control ring 19: | 12 mm |
| Plate thickness of flange 18: | 0.3 mm |
| Width of control ring 19 excluding the flange thickness: | 1.6 mm |
| Dimensional ratio of flange plate thickness T to control ring inner diameter D: | 1/40 |

Application Embodiment 2

Figure 6:
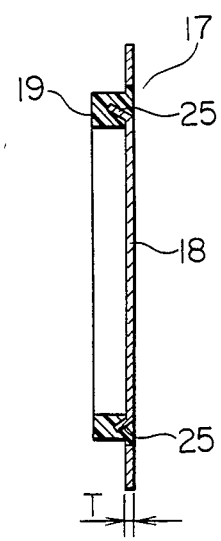

FIGS. 6 and 6 show a second embodiment of another hub to a disk cartridge of 3.5-inch nominal size, where the basic structure of hub 17 is the same as that to the disk cartridge of 2.5-inch nominal size of Application Embodiment 1, except that the shape of driving hole 23 is changed to a sector shape.

The main dimensions of hub 17 are as follows:

| | |
|---|---|
| Cylindrical wall thickness of control ring 19: | 1.2 mm |
| Inner diameter of control ring 19: | 15.8 mm |
| Plate thickness of flange 18: | 0.4 mm |
| Width of control ring 19 excluding the flange thickness: | 1.7 mm |

Application Embodiment 3

Figure 7:
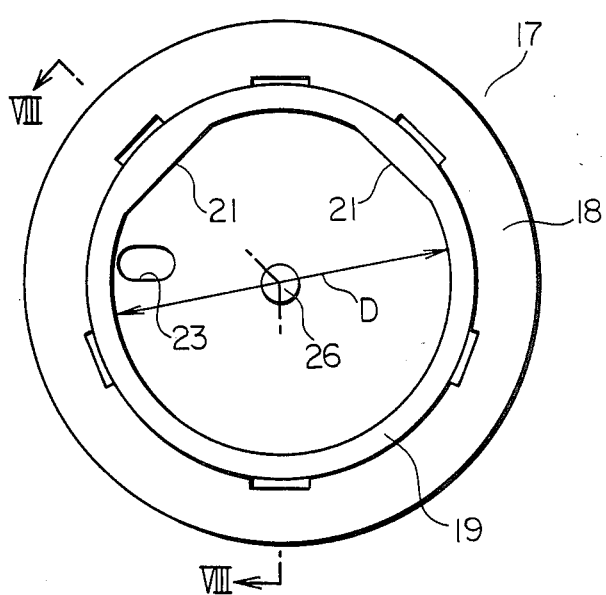
FIGS. 7 and 8 show a third application embodiment of a hub according to the present invention, where
Figure 8:
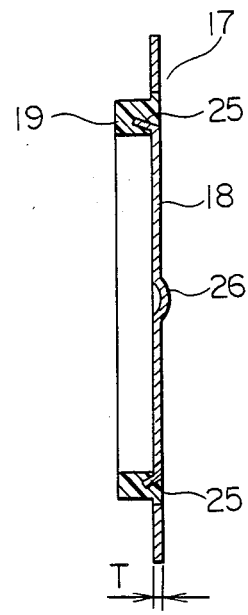
Figure 9:
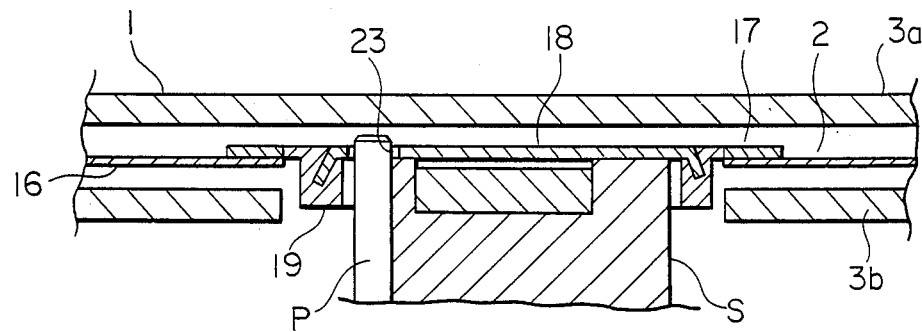
FIG. 9 shows a vertically cross-sectional front view of a hub and its neighboring structure according to the prior art.

FIGS. 7 and 8 show a third application embodiment of other hub for a disk cartridge of 5-inch nominal size, where the hub 17 has basically the same structure as that for the disk cartridge disk of 2.5-inch nominal size as shown in FIGS. 1 to 4, but there are small changes in the shape, that is, the shape of the driving hole 23 is changed to an oblong shape and a projection 26 for attrition reduction is provided at the center of the plate surface of flange 18.

The main dimensions of hub 17 are as follows:

| | |
|---|---|
| Cylindrical wall thickness of control ring 19: | 1.5 mm |
| Inner diameter of control ring 19: | 21 mm |
| Plate thickness of flange 18: | 0.5 mm |
| Width of control ring 19 excluding the flange thickness: | 2 mm |
| Dimensional ratio of flange plate thickness T to control ring inner diameter D: | 1/42 |

EXAMPLE 1

Figure 3:
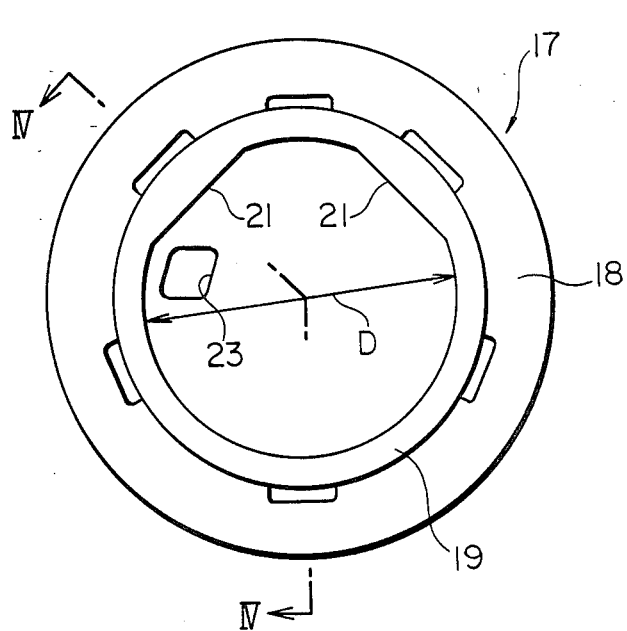

Hubs 17 shown in FIGS. 2 to 4 were outsert molded from compound plastics composed each of polybutylene terephthalate as a plastic base material and 0 to 30% by weight of potassium titanate in a whisker for as a filler, on the basis of the weight of the respective compound plastic, as shown in the following Table 1. The whiskers of potassium titanate had an average fiber length of 10 to 20 $\mu$m, a fiber diameter of 0.2 to 0.5 $\mu$m, a Mohs hardness of 4.0, a tensile strength of 500 to 700 kgf/mm$^2$, a modulus in tension of about 28,000 kgf/mm$^2$, and a volume resistivity of $3.3 \times 10^{15}$ $\Omega$.cm. The flange 18 was made from a stainless steel sheet (3 mm-thick, SUS 430).

TABLE 1

| Potassium titanate (wt. %) | 0 | 5 | 10 | 15 | 20 | 30 |
|---|---|---|---|---|---|---|
| Material No. | Comp. Ex. 1 | 1 | 2 | 3 | 4 | 5 |

EXAMPLE 2

In the material No. 4 of Example 1, a hub 17 was outsert molded in the same manner as in Example 1, except that polybutylene terephthalate was replaced with polyacetal as the plastic base material. The thus obtained hub was identified as material No. 6. Another hub molded from the same compound plastic without the filler, that is, single polyacetal was identified as Comparative Example 2.

EXAMPLE 3

Hubs 17 were outsert molded in the same manner as in Example 1, except that the whiskers of potassium titanate were replaced with talc, calcium carbonate, graphite or glass fibers as the filler in Example 2. They were identified as given in the following Table 2.

TABLE 2

| Filler | Talc | Calcium carbonate | Graphite | Glass fibers |
|---|---|---|---|---|
| Material No. | 7 | 8 | 9 | 10 |

Evaluation

The amounts of warping deformation $\delta$ of the hubs 17 obtained by outsert molding the said materials Nos. 1 to 10 and Comparative Examples 1 to 2 were measured. As shown in FIG. 4, the amounts of warping deformation $\delta$ were determined by measuring a difference in the thickness direction of the flange between the center of the flange 18 and the position of inner side edge of the control ring 19 by a dial gage.

Furthermore, the heat resistace was determined by keeping the hubs at 60° C. for 48 hours, leaing them at the ordinary temperature for 24 hours, and observing a change in the inner diameter of control ring 19.

As to the mechanical strength, attrition resistance was determined by engaging a rotating shaft S with the hub 17 by 20,000 repetitions and visually observing the attrition state of the positioning part 21.

The test results are shown in the following Table 3 together with the molding shrinkages of the respective materials.

As to the heat resistance, a round mark "O" shows no change; a triangular mark "Δ" shows a little change; a crossed mark "X" shows a substantial change.

As to the attrition resistance, a double round mark " " shows no substantial attrition; a round mark "O" shows a slight attrition; a triangular mark "Δ" shows a substantial attrition.

TABLE 3

| Material No. | Amount of warping deformation ($\mu$m) | Heat resistance | Attrition resistance | Molding shrinkage |
|---|---|---|---|---|
| 1 | 35 | Δ | | 1.5 |
| 2 | 20 | Δ | | 1.3 |
| 3 | 15 | | | 1.0 |
| 4 | 7 | | | 0.8 |
| 5 | 6 | | | 0.6 |
| 6 | 8 | | | 0.8 |
| 7 | 7 | | Δ | 1.7 |
| 8 | 10 | | Δ | 1.8 |
| 9 | 18 | Δ | | 1.8 |
| 10 | 5 | | Δ | 0.5 |
| Comp. Ex. | 40 | Δ | | 1.9 |
| Comp. Ex. | 50 | X | | 2.0 |

In outsert molding of a hub 17 comprising a plastic control ring 19 and a flange 18 of thin metal sheet, the control ring 19 is outsert molded from a compound plastic containing a reinforcing filler capable of improving a molding shrinkage in the present invention, whereby the coefficient of thermal expansion of the control ring 19 can be made as near that of the material of constructions for the flange 18 as possible, and thus the warping deformation of the flange 18 can be lowered to a negligible degree during the mold solidification, attaining a higher plane precision and preventing a track deviation, etc. Furthermore, the mechanical strength and the attrition resistance can be increased by the reinforcing action of the filler, as is obvious from Table 3, and thus the control ring 19 can be given an improved durability and a smaller size with ease.

What is claimed is:

1. A disk cartridge which comprises a case and a disk within the case, the disk comprising a circular magnetic sheet and a hub with a circular metal plate flange and a control ring integrated with the flange by outsert molding the control ring from a compound plastic of a plastic material containing 5 to 40% by weight of a filler, wherein the flange covers substantially a central area defined by the control ring, the circular magnetic sheet is fixed to the flange at the outer periphery thereof and the control ring has a positioning surface at an inner peripheral wall thereof for centering the disk on a disk drive.

2. A disk cartridge according to claim 1, wherethe plastic base material for the compound plastic is polybutylene terephthalate.

3. A disk cartridge according to claim 1, wherein the plastic base material for the compound plastic is polyacetal.

4. A disk cartridge according to claim 1, 2 or 3, wherein the filler is a reinforcing filler which improves molding shrinkage of the compound plastic.

5. A disk cartridge according to claim 4, wherein the reinforcing filler is potassium titanate.

6. A disk cartridge which comprises a case and a disk within the case, the disk comprising a circular magnetic sheet and a hub with a circular metal plate flange and a control ring integrated with the flange by molding the control ring from a compound plastic of a plastic base material containing 5 to 40% by weight of a filler a dimensional ratio of flange thickness to a control ring inner diameter being 1/50 to 1/30, where the flange covers substantially a central area defined by the control ring, the circular magnetic sheet is fixed to the flange at the outer periphery thereof and the control ring has a positioning surface at an inner peripheral ring thereof for centering the disk on a disk drive.

7. A disk cartridge according to claim 6, wherein the plastic base material for the compound plastic is polybutylene terephthalate.

8. A disk cartridge according to claim 6, wherein the plastic base material for the compound plastic is polyacetal.

9. A disk cartridge according to claim 6, wherein the filler is a reinforcing filler which improves molding shrinkage of the compound plastic.

10. A disk cartridge according to claim 9, wherein the reinforcing filler is potassium titanate.

11. A disk cartridge which comprises a case and a disk encased in the case, the disk comprising a circular magnetic sheet and a hub, the hub comprising a circular metal plate flange and a control ring coaxially fixed to the flange, said flange being substantially solid at a central portion thereof, said central portion being located within the control ring, the circular magnetic sheet being fixed to the flange at an outer periphery thereof, and the control ring having a positioning surface at an inner peripheral wall thereof for centering the disk on a disk drive and being integrally outsert molded with the flange by a compound plastic of a plastic base material containing 5 to 40% by weight of a filler.

12. A disk cartridge according to claim 11, wherein a dimensional ratio of flange thickness to a control ring inner diameter is 1/50 to 1/30.

13. A disk cartridge according to claim 11, wherein the plastic base material for the compound plastic is polybutylene terephthalate.

14. A disk cartridge according to claim 11, wherein the plastic base material for the compound plastic is polyacetal.

15. A disk cartridge according to claim 11, wherein the filler is a reinforcing filler which improves molding shrinkage of the compound plastic.

16. A disk cartridge according to claim 15, wherein the reinforcing filler is potassium titanate.

* * * * *